United States Patent
Cruickshank

[19]
[11] Patent Number: 6,089,489
[45] Date of Patent: Jul. 18, 2000

[54] PIPELINE STORAGE

[75] Inventor: John Duncan Cruickshank, Kincardinshire, United Kingdom

[73] Assignee: Coflexip Stena Offshore Limited, Aberdeenshire, United Kingdom

[21] Appl. No.: 09/171,828

[22] PCT Filed: Apr. 24, 1997

[86] PCT No.: PCT/GB97/01130

§ 371 Date: Dec. 24, 1998

§ 102(e) Date: Dec. 24, 1998

[87] PCT Pub. No.: WO97/41054

PCT Pub. Date: Nov. 6, 1997

[30] Foreign Application Priority Data

Apr. 26, 1996 [GB] United Kingdom .................. 9608667

[51] Int. Cl.[7] .................................................. B65H 75/36
[52] U.S. Cl. .................. 242/360; 242/362; 137/355.16; 137/899.1; 254/134.35 C; 405/168.3; 406/40
[58] Field of Search ..................................... 242/360, 362, 242/362.1, 363; 137/355.12, 355.16, 355.26, 355.27, 355.28, 899.1; 166/77.2; 175/103; 138/106; 254/134.3 R, 134.35 C; 405/158, 168.3, 170; 406/40

[56] References Cited

U.S. PATENT DOCUMENTS

| | | | |
|---|---|---|---|
| 3,247,674 | 4/1966 | Macardier | 242/362 |
| 3,724,567 | 4/1973 | Smitherman | 175/203 |
| 3,817,466 | 6/1974 | Reynard et al. | 242/360 |
| 3,941,146 | 3/1976 | Chatard | 137/355.16 |
| 3,955,593 | 5/1976 | Umphrey et al. | 137/355.16 |
| 5,595,355 | 1/1997 | Haines | 254/134.3 R |

*Primary Examiner*—John M. Jillions
*Attorney, Agent, or Firm*—Ostrolenk, Faber, Gerb & Soffen, LLP

[57] ABSTRACT

A storage system for storing continuous lengths of rigid pipe, particularly for storage of pipe prior to the spooling of the pipe onto the pipe storage reel of a marine pipelay vessel. The system comprises a loop of rail track with a plurality of rail bogies arranged around the circumference of the loop. The bogies are adapted to retain and receive multiple turns of the length of pipe extending around the loop. The radius of curvature of the loop is selected such that the bending of the pipe around the loop does not result in plastic deformation of the pipe. Arrangements for loading and offloading the pipe may include: a pipe guide suspended from a gantry spanning the track and a pipe loading/offloading path; pipe tensioning means located downstream of the pipe guide in the offloading direction; and an "expansion arc" extending from the loading/offloading point to allow variations in the length of the pipeline path extending from the loop to a vessel mooring location.

28 Claims, 6 Drawing Sheets

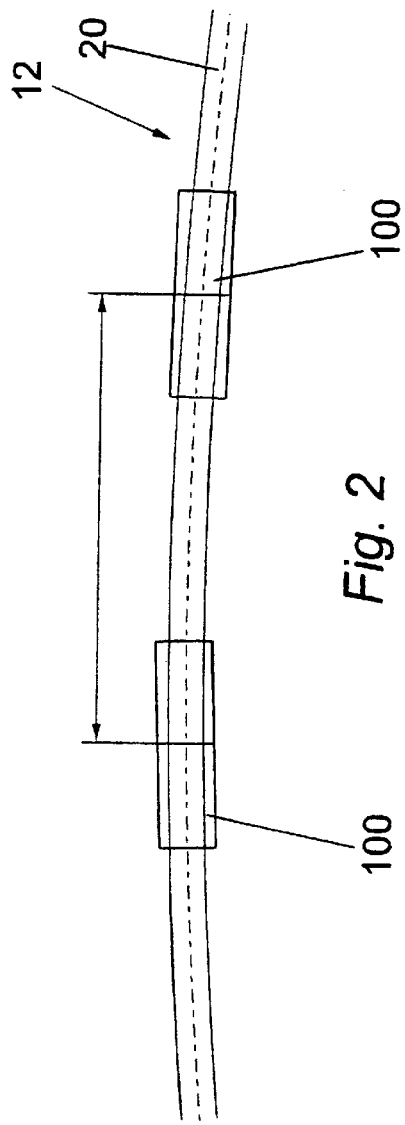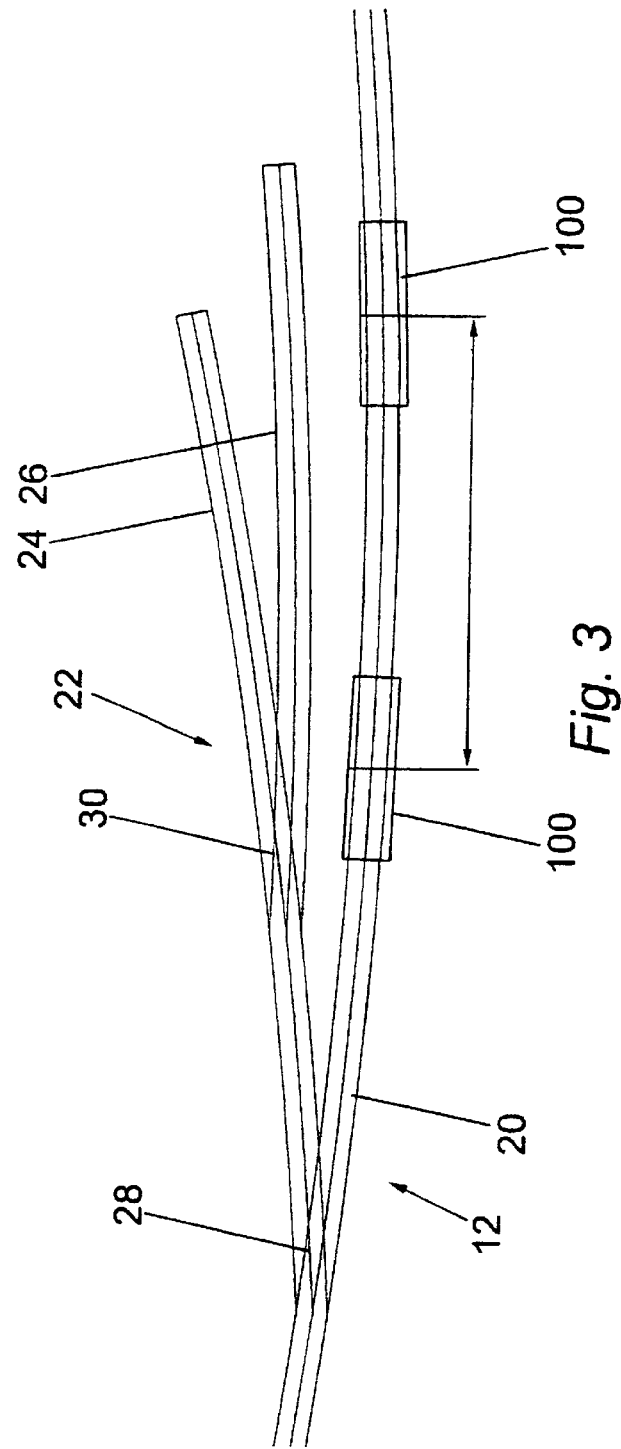

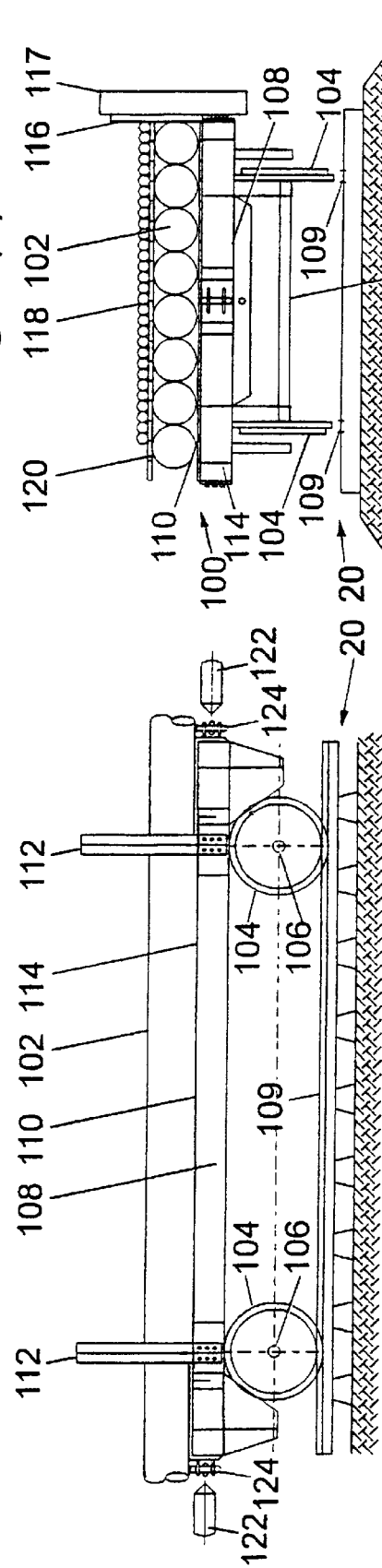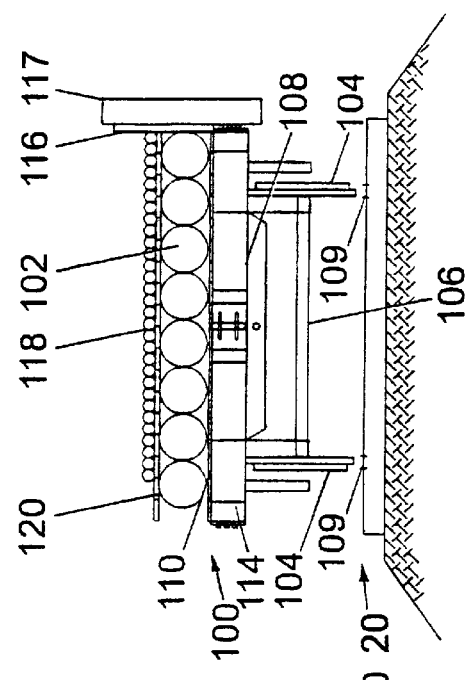

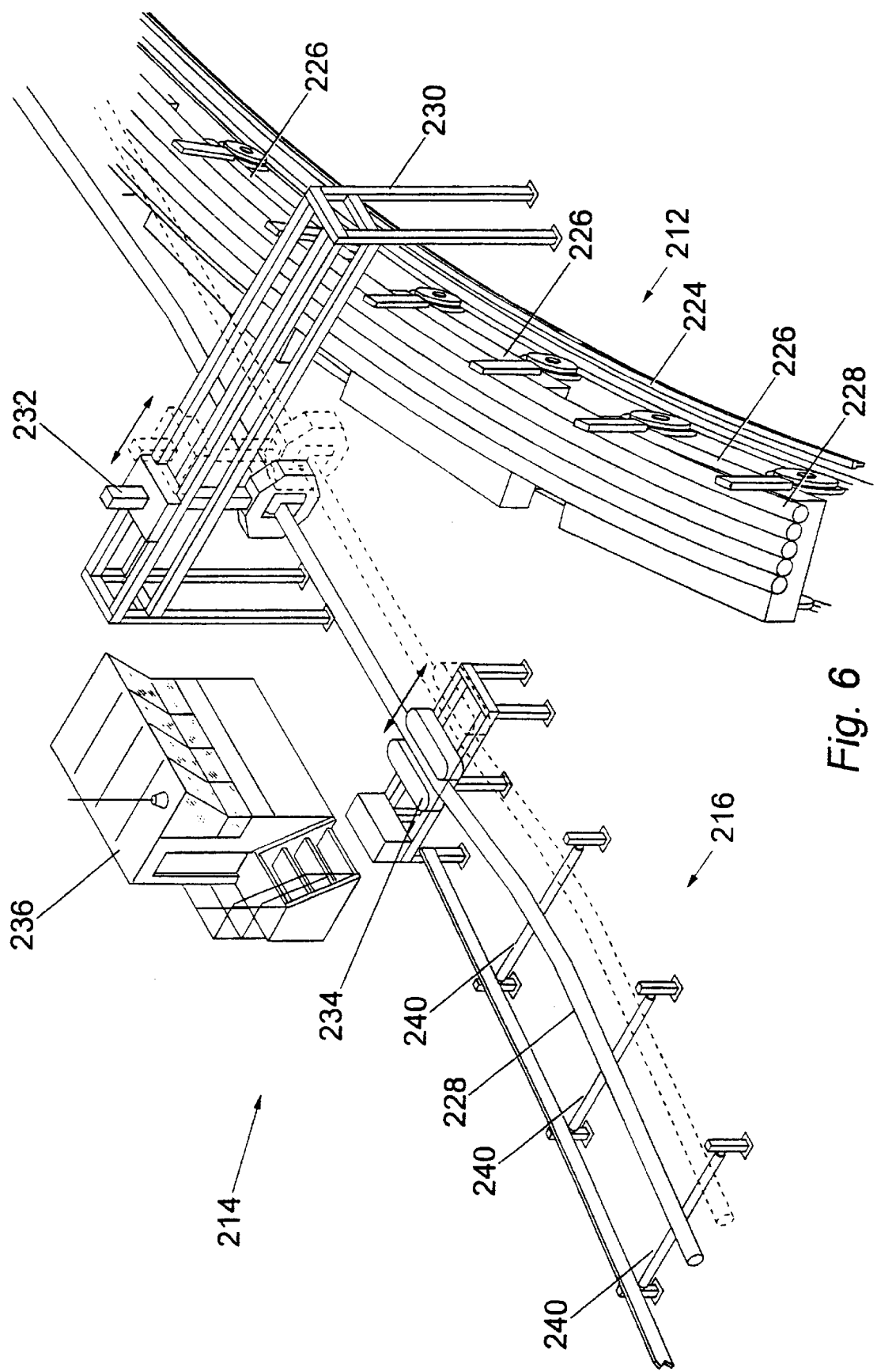

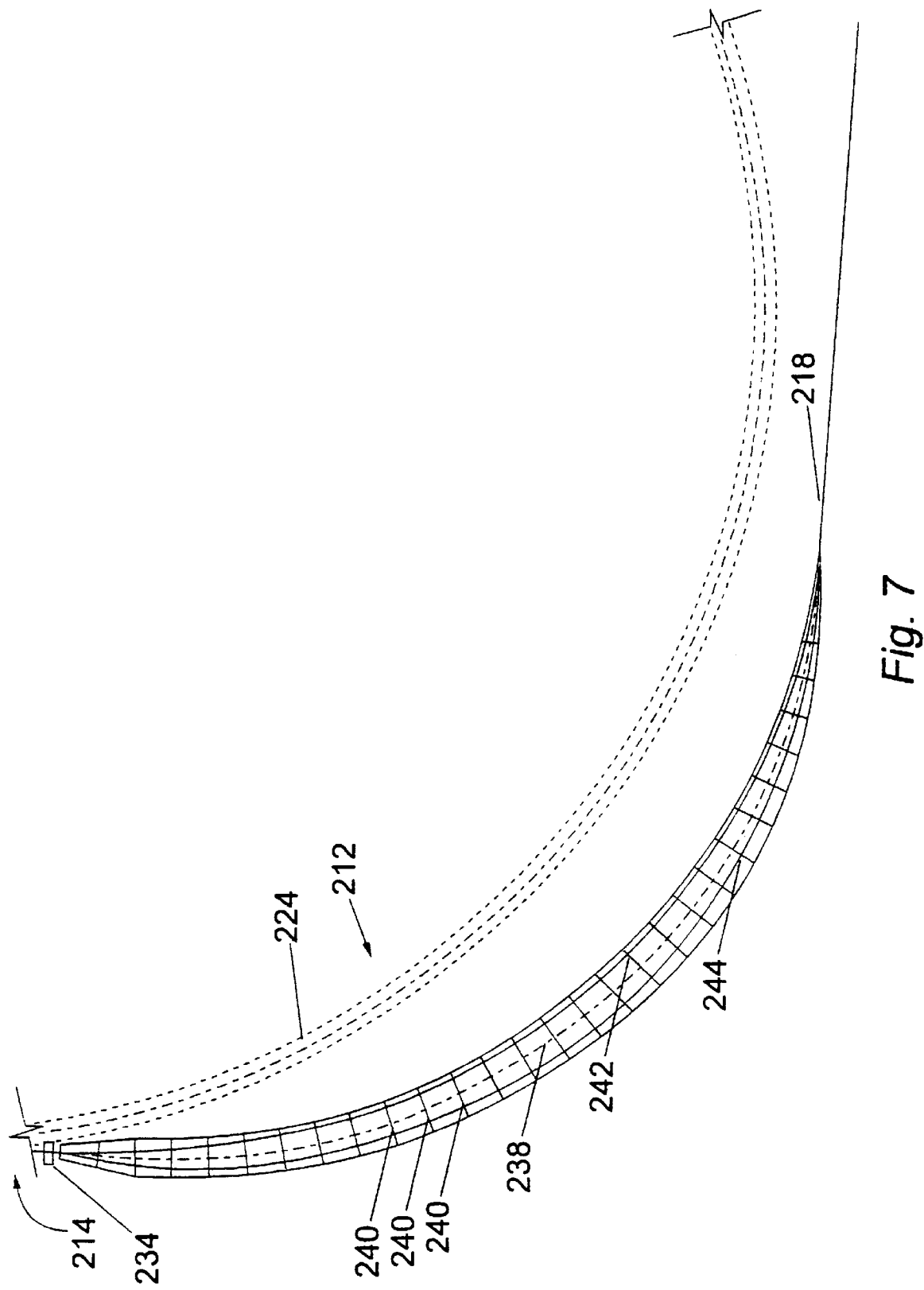

PIPELINE STORAGE

BACKGROUND OF THE INVENTION

The present invention relates to a method and apparatus for the storage of continuous lengths of rigid pipeline. The invention is most particularly intended for use in the temporary storage of lengths of rigid pipeline prior to said pipeline being spooled onto the storage reel of a reel-type marine pipelaying vessel.

In reel-pipelaying operations, the pipeline to be laid is spooled onto a reel, mounted on the pipelaying vessel, and subsequently unspooled as the pipe is laid. The pipe is plastically deformed during spooling, and is straightened during unspooling prior to departure from the vessel.

The reel pipe-laying vessel "Apache" has a pipelay reel with a capacity of approximately 2000 tonnes of rigid pipeline up to 16 inches diameter. The pipeline is assembled by welding standard 40 foot pipe joints into 1 kilometre stalks which are stored on racks at an onshore spoolbase. The stalks may be assembled and stored whilst the vessel is away from the spoolbase on pipelaying operations. When the vessel is at the spoolbase to receive a load of pipe, the pre-assembled stalks are spooled onto the reel of the vessel with tie-in welds between stalks being made during the spooling process. The need to make, inspect and coat the tie-in welds necessarily prolongs the nonproductive time required to spool a load of pipe onto the vessel. It would be desirable to reduce the length of time occupied by the spooling operation, so as to maximise the availability of the vessel for productive pipelaying operations.

SUMMARY OF THE INVENTION

The present invention provides a method and apparatus whereby a continuous length of rigid pipeline, up to a length substantially equal to or greater than the maximum capacity of the pipelay vessel, may be assembled and stored onshore, whereby a full load of pipe may be spooled onto the vessel in a substantially continuous manner so as to minimise the time required for the spooling operation.

In accordance with a first aspect of the invention, there is provided a pipeline storage apparatus comprising a closed loop of rail track (or equivalent) lying on a substantially horizontal plane, a plurality of rail bogies mounted on said track and distributed around said loop, and means for driving said bogies along said track in synchronism with one another, said bogies being adapted to receive and retain a plurality of turns of a continuous length of pipeline extending around said loop.

Preferably, the periphery of said loop is continuously curved such that at every point around the periphery thereof the radius of curvature of the loop is greater than a predetermined minimum value. Preferably also, said minimum radius of curvature of the loop is selected such that, for a pipeline having a predetermined maximum diameter which is intended to be capable of being stored on the apparatus, the elastic yield limit of that pipeline will not be exceeded by bending the pipeline for storage thereon. Most preferably, said minimum radius of curvature is selected so that the stresses induced on said pipeline do not exceed 72% of its elastic yield limit.

Preferably also, the loop is substantially circular, having a substantially constant radius of curvature.

Preferably also, said bogies are spaced substantially equidistantly around the loop.

Preferably, the minimum radius of curvature is at least 150 metres so that the maximum diameter of pipe which may be stored on the apparatus without stresses exceeding 72% of the elastic yield limit is at least 16 inches.

The apparatus preferably further includes a pipe handling apparatus for loading and offloading pipe to and from said loop. The pipe handling apparatus preferably includes: a pipeline path extending from a loading/offloading point on the loop for guiding the pipe towards a firing line extending towards a mooring location for a pipelay vessel; pipe guide means suspended from a gantry traversing said track and said pipe path at or adjacent to said loading/offloading point, said pipe guide means being mounted for transverse movement along said gantry; and pipe tensioning means located on said pipe path downstream of said pipe guide means in the direction of pipe offloading.

The pipe path preferably also includes an expansion arc portion of sufficient width to allow the length of the pipe path to vary in response to differential movements of the bogies around the track and of a reel of a pipelay vessel onto which the pipe is being spooled.

The expansion arc preferably comprises a series of pipe supporting roller members arranged along an arcuate path, the rollers having substantially horizontal axes of rotation extending substantially radially with respect to said arcuate path.

In accordance with a second aspect of the invention, there is provided a rail bogie for use in apparatus according to the first aspect of the invention, said bogie including pipe supporting means and pipe restraining means located on one side of the pipe supporting means which faces the interior of the storage loop, in use.

The pipeline contacting surfaces of the supporting means and restraining means are preferably formed from or faced with protective material, such as elastomer or polymer material.

Preferably also, bogies in accordance with the second aspect of the invention are connected together, in use, by rigid, elongate coupling members connected to close tolerance coupling assemblies on the ends of the bogies.

In accordance with a third aspect of the invention, there is provided a method of storing a continuous length of pipeline, comprising the steps of:

providing a closed loop of rail track (or equivalent) lying on a substantially horizontal plane;

mounting a plurality of rail bogies on said track such that said bogies are distributed around said loop, said bogies being adapted to receive and retain a plurality of turns of a continuous length of pipeline extending around said loop;

securing a first end of a pipeline to one of said bogies;

driving said bogies along said track in synchronism with one another such that said pipeline extends around said loop, supported by said bogies.

Preferably, said pipeline is wound onto pipeline supporting means of said bogies, the first wrap of the pipe abutting pipe restraining means located on one side of the pipe supporting means which faces the interior of the storage loop, and subsequent wraps lying side by side on said pipeline supporting means, forming a first layer of pipe. Additional layers of pipe my be wound on top of the first layer, the layers being separated by battens. The additional layers may comprise lengths of pipe of differing diameters.

BRIEF DESCRIPTION OF THE DRAWINGS

Embodiments of the invention will now be described, by way of example only, with reference to the accompanying drawings, in which:

FIG. 2 is a schematic plan view of a portion of the storage loop of FIG. 1;

FIG. 3 is a plan view of a portion of the storage loop of FIG. 1, incorporating wagon sidings;

FIGS. 4(a), 4(b) and 4(c) are, respectively, side, end and plan views of a rail bogie in accordance with the second aspect of the invention;

FIG. 6 is a perspective view illustrating a pipe loading/offloading area of the pipe storage loop of FIG. 5; and FIG. 7 is a plan view of an expansion arc forming part of the storage loop of FIG. 5.

DETAILED DESCRIPTION OF THE PREFERRED EMBODIMENTS

Figure 1:
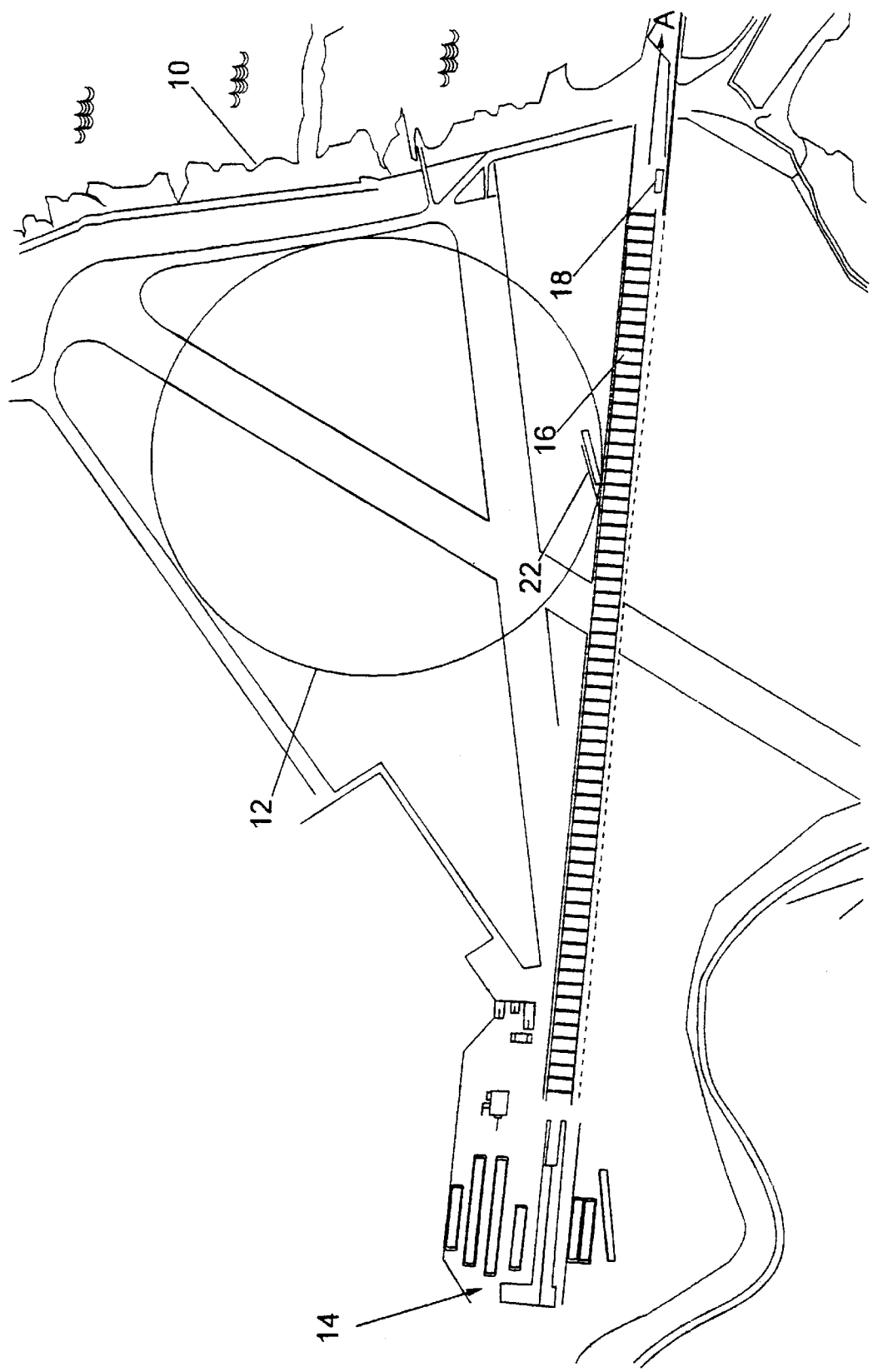
FIG. 1 is a schematic plan of an onshore spoolbase incorporating a pipe storage loop in accordance with the first aspect of the invention.

FIG. 1 illustrates the layout of one example of a conventional spoolbase, located onshore adjacent a coastline 10, having a pipe storage loop 12, in accordance with the invention, superimposed thereon.

The conventional spoolbase comprises a main pipe fabrication plant 14, where individual joints of the pipe are welded together to form stalks. The stalks are conventionally stored on pipe racks 16, which extend between the welding plant 14 and a tie-in welding station 18 adjacent the coastline 10. In this example, the pipe racks are approximately 1 km in length. In accordance with conventional practice, the stalks are spooled onto the storage reel of the pipelaying vessel (not shown) in the direction of the arrow A, tie-in welds being formed between subsequent stalks, at station 18, as spooling progresses. The pipe racks 16 of the conventional spoolbase are rendered redundant by the present invention.

The storage loop 12 in accordance with the invention comprises a closed loop of rail track, having a plurality of interconnected rail bogies (or wagons or carriages) 100 (FIGS. 2, 3 and 4(a)–4(c)) distributed about its circumference. The loop is preferably circular, as in this example, but may be non-circular so long as its radius of curvature is nowhere less than a predetermined minimum value selected to suit the maximum diameter of pipe which is to be accommodated.

As noted above, it is preferred that the minimum radius of curvature is selected such that the elastic yield limit of the pipe is not exceeded when the pipe is bent around the storage loop, and preferably such that the stresses imposed on the pipe do not exceed 72% of its yield limit. For a 16 inch diameter pipe, this requires a loop approximately 300 meters in diameter (ie. a radius of curvature not less than 150 meters). In the illustrated example, the loop has a diameter of 450 meters. It will be noted however that the invention is not restricted to non-plastic bending of the stored pipe. It is also possible for the pipe to be bent plastically when wound onto the storage loop and to be straightened on removal, allowing the minimum radius of curvature of the loop to be reduced for a given pipe diameter. Straightening apparatus and methods for this purpose are well known from reel pipelay systems and will not be described further herein.

FIGS. 2 and 3 illustrate portions of the 450 meter diameter loop 12 of FIG. 1 in greater detail. FIG. 2 shows the location of two wagons 100 on the rail track 20. The wagons 100 will be spaced substantially equidistantly around the length of the loop. In this example the wagons 100 have a spacing of 18 meters between wagon centres. This would require seventy seven wagons for a 450 meter diameter loop. FIG. 3 shows an optional arrangement for sidings 22 extending into the interior of the loop 10, allowing wagons 100 to be taken out of the loop for servicing etc. The arrangement includes two individual sidings 24, 26 with points 28, 30 at the track junctions, as will be readily understood by those skilled in the art.

In use, pipeline fabricated in the main plant 14 is fed towards the storage loop 12. As shall be described further below, the wagons 100 are adapted to receive and retain the pipeline such that, when the pipeline is secured to one of the wagons, the wagons may be driven around the loop 12 so as to wind the pipe onto a supporting surface provided by the wagons, so that multiple turns of the pipeline may be wrapped around the length of the loop. This is best seen in FIG. 4(a)–4(c), which illustrates the configuration of the wagons 100 and the disposition of the pipe 102 thereon, in use.

The wagons 100 may be purpose built or may be converted from existing rolling stock, such as conventional hopper wagons. Each comprises of two pairs of flanged wheels 104, mounted on respective axles 106 beneath a chassis 108, which engage the rails 109 of the track 20 in a well known manner. A horizontal pipe supporting deck 110 is mounted on the chassis, and vertical pipe retaining struts 112 are mounted on that side of the chassis 108 which will face the interior of the loop 12, in use.

The struts 112 restrain inward movement of the pipe 102 when the pipe is wound onto the loop. As best seen in FIG. 4(b), the wraps of pipe 102 lie side by side on the deck 110. In this example, the wagon 100 accommodates 8 wraps of 16 inch pipe 102. For a 450 meter loop, this corresponds to a total pipeline length of about 11 km. The pipeline contacting surfaces of the deck 110 and struts 112 may be faced with protective material, such as polymers or elastomers, to protect the pipe against damage. In this example, the deck 110 is faced with a 25 mm thickness of UHMW polyethylene 114, and the struts 110 with 'D' rubber 116.

More than one layer of pipe may be wrapped on the loop. Additional layers may be continuations of the first layer, or may be comprise separate pipelines. In FIG. 4(b), a second layer 118 is shown comprising a separate 4 inch pipeline, separated from the first layer by means of timber battens 120.

The wagons are preferably interconnected by means of rigid, elongate connecting members 122, such as lengths of steel pipe, connected to the wagons by suitable couplings 124. The conventional "instanter" rolling stock coupling is preferably replaced with a close tolerance coupling such as a clevis pin assembly, to prevent relative movement between wagons which might damage the pipe or pipe coatings.

Conversion of standard rolling stock preferably also includes increasing the overall width and the track width, and lowering the suspension and deck height. The wagons may further be modified in view of the fact that they will always be travelling on a closed loop within which the inside track is shorter in length than the outside track. For example, the wheels of the wagons may be mounted on individual stub axles, rather than in pairs on conventional through-axles.

The wagons 100 may be driven by a locomotive which may be purpose built or converted from an existing locomotive (the power sources of most commuter trains are below floor level, allowing a clear deck area above for supporting the pipe), preferably including conversion to a hydraulic power source. Alternatively, drive means may be incorporated into some of the wagons. For example, hydraulic motors could be fitted to, say, every sixth wagon, each pump being electrically controlled from a central station communicating with each driven wagon via an RS 232 interface. Speed control would be achieved using a closed loop feedback system.

The pipeline can be wound onto the storage loop as the pipeline fabrication proceeds. This could be done by assembling stalks and making tie in welds as the stalks are wound onto the loop, or directly from the main welding plant 14. When the pipeline is to be transferred from the loop onto the reel of a pipelaying vessel, the end of the pipeline which was the trailing end during winding onto the storage loop becomes the leading end for spooling onto the vessel. In the illustrated example, the pipe supporting wagons would be driven in the same direction (counter-clockwise) for both winding the pipeline onto the loop and for spooling the pipeline from the loop onto the vessel.

Figure 5:
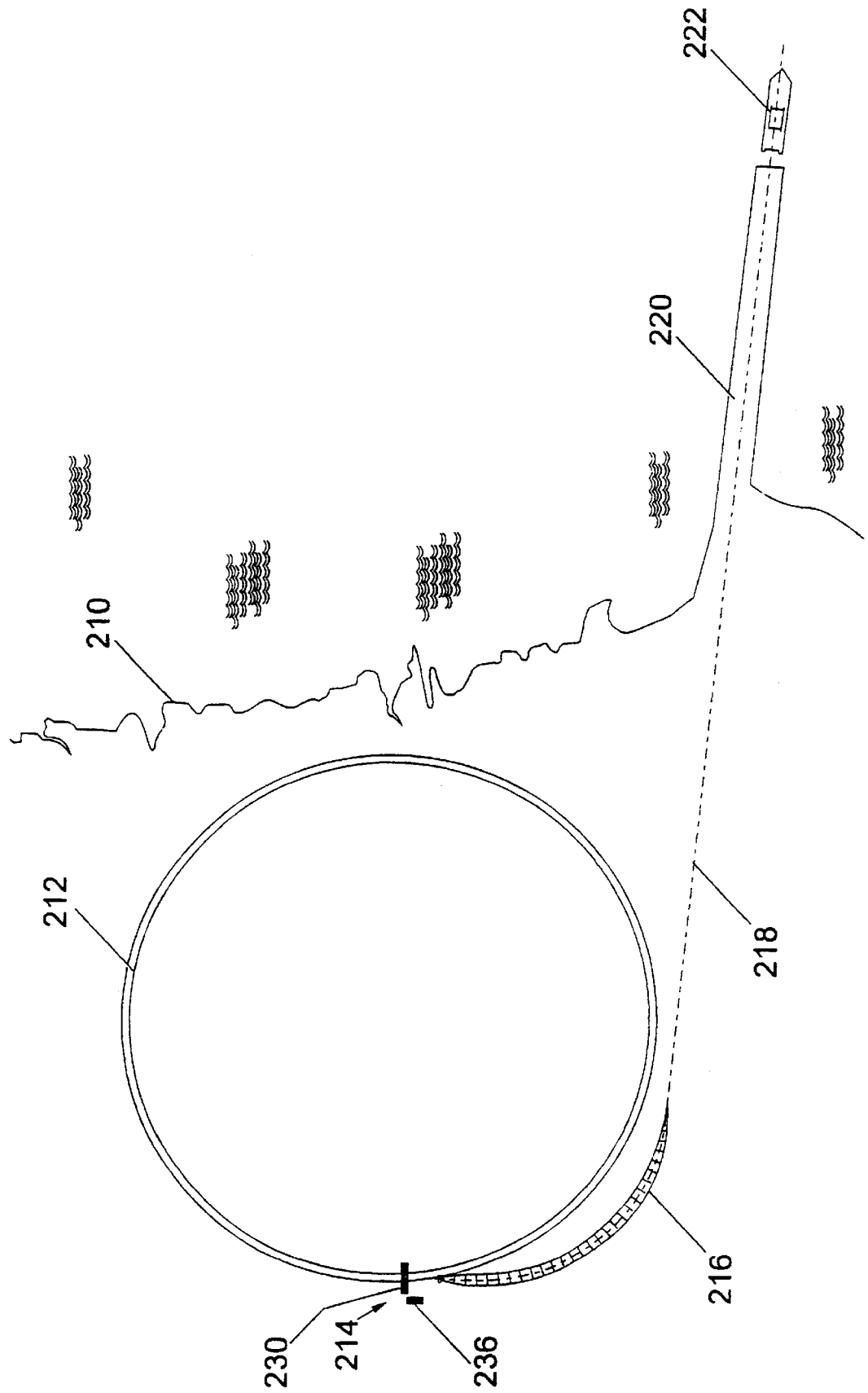
FIG. 5 is a plan view of a preferred embodiment of a pipe storage loop in accordance with the invention.

FIGS. 5 to 7 illustrate a preferred embodiment of the invention. A circular storage loop 212 is located adjacent the coastline 210. The main storage loop 212 may be substantially the same as that described above with reference to FIGS. 1 to 4. In this case the sidings 22 have been omitted.

In this embodiment the storage facility includes a pipe loading/offloading area 214 and an "expansion arc" 216, both of which are described in greater detail below.

The expansion arc 216 leads from the loop 212 to a firing line 218 which extends along causeway 220 to the location where the pipelay vessel 222 is moored for loading.

FIG. 6 illustrates the loading/offloading area 214 of FIG. 5 in greater detail. FIG. 6 shows a portion of the storage loop 212 comprising track 224 with bogies or wagons 226 supporting multiple turns of pipe 228. A gantry 230 spans the track 224, extending outside of the loop 212 so as to overlie a pipe approach path which is approximately tangential to the track 224 at the point of loading/offloading. Suspended beneath the gantry 230 for transverse movement along the length thereof is a "roller box" 232 through which the pipe 228 passes during loading or off loading.

The roller box acts as a guide for the pipe and may include sensors for monitoring the position and orientation of the pipe. Pipe guides of this type are used in the laying of pipe from reel-type pipelay vessels such that as disclosed in U.S. Pat. No. 4,269,540, and will not be described in greater detail herein. Transverse movement of the roller box 232 on the gantry 230 permits the pipe to be guided accurately during loading and unloading.

Downstream of the roller box 232 in the direction of offloading is a tensioning unit 234 for controlling the tension on the pipeline during loading and offloading operations. The tensioning unit comprises a pair of roller track assemblies located on either side of the pipe and mounted for transverse movement with the roller box 232. A pipe tensioning apparatus of this type is well known in the field of marine pipelaying and will not be described in greater detail herein. The tensioner applies a degree of back tension to the pipe during loading and unloading and while the pipe is stored on the loop, so as to oppose the tendency of the bent pipe to spring outwardly. Typically, one or two tonnes of tension might be required.

If the storage loop is configured such that the pipe is plastically deformed when wound thereon then the tensioning unit 234 may also include means for straightening the pipe during offloading. The straightening means may comprise a three-point straightener of the type which is also well known in the field of marine pipelaying. The straightener and tensioner may be integrated into a single unit, as is also well known. A control cabin 236 houses the personnel and apparatus required to control the operation of the storage facility.

During offloading of the pipe, it will be necessary for the rotation of the pipe storage reel on the pipelaying vessel to be coordinated with the movement of the wagons 226 around the loop 212. Clearly, if the movements of the reel and the wagons are not coordinated with sufficient precision then it is possible that the pipe will be damaged as a result of excessive tensile or compressive forces being applied. For this reason, the loading/offloading arrangement preferably includes an expansion arc 216 as seen in FIG. 5 and further illustrated in FIGS. 6 and 7.

The expansion arc 216 comprises of a series of pipe supports defining an arcuate path of sufficient width to allow a nominal pipeline path 238 along the centre of the path to be lengthened or shortened in response to differential movements of the reel and the wagons. In this example, the expansion arc comprises a series of rollers 240 having their axes of rotation extending at right angles to the nominal pipeline path 238. In the present example the rollers 240 are suitably about 10 metres in length (i.e. the path is about 10 metres wide). The rollers 240 might be reduced in length towards either end of the expansion arc 216. FIG. 7 illustrates the maximum and minimum pipeline excursion routes 242 and 244 respectively along the expansion arc 216.

It will be understood that, in the embodiment of FIGS. 5 to 7, the pipe is loaded and offloaded along the same path, so that the direction of movement of the wagons is reversed in each case. The fabrication of the pipeline for loading onto the loop may be carried out at a welding station (not shown) at any suitable location along the firing line 218. Alternatively, lengths of pipe may be assembled into stalks away from the firing line 218 prior to being transported to the firing line, tie-in welds being made between successive stalks before being spooled onto the storage loop.

The embodiments of the invention described herein utilise conventional rail track and converted rolling stock. However, it will be appreciated that a similar storage facility might be constructed using purpose-built tracks etc, which might differ in configuration from conventional track and rolling stock.

Improvements and modifications may be incorporated without departing from the scope of the invention.

What is claimed is:

1. A pipeline storage apparatus comprising:
    a closed loop of rail track lying on a substantially horizontal plane
    a plurality of rail bogies mounted on said track and distributed around said loop;
    means for driving said bogies along said track in synchronism with one another, said bogies being adapted to receive and retain a plurality of turns of a continuous length of pipeline extending around said loop; and
    means for loading and offloading said pipeline to and from said bogies; wherein
    said pipe loading/offloading means is arranged so as to define a substantially horizontal pipe approach path which is approximately tangential to said loop at a point of loading/offloading.

2. The apparatus as claimed in claim 1, wherein the periphery of said loop is continuously curved such that at every point around said periphery thereof, the radius of curvature of said loop is greater than a predetermined minimum value.

3. The apparatus as claimed in claim 2, wherein said radius of curvature of said loop is selected such that, for a pipeline having a predetermined maximum diameter which is intended to be capable of being stored on said apparatus, the elastic yield limit of the pipeline will not be exceeded by bending said pipeline for storage thereon.

4. The apparatus as claimed in claim 2, wherein said minimum radius of curvature is selected so that stresses induced on said pipeline do not exceed 72% of the elastic yield limit of said pipeline.

5. The apparatus as claimed in claim 1, wherein said loop is substantially circular, having a substantially constant radius of curvature.

6. The apparatus as claimed in claim 1, wherein said bogies are spaced substantially equidistantly around the loop.

7. The apparatus as claimed in claim 6, wherein said bogies are spaced apart from one another and adjacent bogies are connected to one another by a rigid, elongated coupling member.

8. The apparatus as claimed in claim 7, wherein each of said coupling members is connected at each end to a respective bogie by a pivot arrangement having a substantially vertical pivot axis.

9. The apparatus as claimed in claim 1, wherein the minimum radius of curvature is at least 150 meters so that the maximum diameter of pipe which may be stored on the apparatus without stresses exceeding 72% of the elastic yield limit of said pipe is at least 16 inches.

10. The apparatus as claimed in claim 1, wherein said pipe loading/offloading means includes a pipe handling apparatus for loading and offloading pipe to and from said loop.

11. The apparatus as claimed in claim 10, wherein said pipe handling apparatus includes a pipeline path, extending from a loading/offloading point on said loop, for guiding said pipe towards a firing line extending towards a mooring location of a pipelay vessel.

12. The apparatus as claimed in claim 11, wherein said pipe handling apparatus includes pipe guide means suspended from a gantry traversing said track and said pipe path at or adjacent to said loading/offloading point, said pipe guide means being mounted for transverse movement along said gantry.

13. The apparatus as claimed in claim 11, wherein said pipe handling apparatus further includes pipe tensioning means located on said pipe path downstream of said pipe guide means in the direction of pipe offloading.

14. The apparatus as claimed in claim 11, wherein said pipe path includes an expansion arc portion of sufficient width to allow the length of said pipe path to vary in response to differential movements of said bogies around said track and based on a reel of a pipelay vessel onto which said pipe is being spooled.

15. The apparatus as claimed in claim 14, wherein said expansion arc comprises a series of pipe supporting roller members arranged along an arcuate path, said rollers having substantially horizontal axes of rotation extending substantially radially with respect to said arcuate path.

16. The apparatus as claimed in claim 1, wherein each of said rail bogies includes pipe supporting means and pipe restraining means, said pipe restraining means being located on a side of said pipe supporting means which faces the interior of the storage loop.

17. The apparatus as claimed in claim 16, wherein pipeline contacting surfaces of said supporting means and said restraining means are formed from or faced with a protective material.

18. The apparatus as claimed in claim 1, wherein said bogies are connected together by rigid, elongated coupling members connected to close tolerance coupling assemblies on the ends of said bogies.

19. A method of storing a length of pipeline, comprising the steps of:

providing a closed loop of rail track lying on a substantially horizontal plane;

mounting a plurality of rail bogies on said track such that said bogies are distributed around said loop, said bogies adapted to receive and retain a plurality of turns of a continuous length of a pipeline extending around said loop;

securing a first end of a pipeline to one of said bogies; and driving said bogies along said track in synchronism with one another such that said pipeline extends around said loop, supported by said bogies;

wherein said pipeline is loaded onto and offloaded from said bogies along a substantially horizontal pipe approach path which is approximately tangential to said loop at a point of loading/offloading.

20. A method as claimed in claim 19, wherein said pipeline is wound onto pipeline supporting means of said bogies, a first wrap of the pipe abutting pipe restraining means located on a side of the pipe supporting means which faces the interior of the storage loop, and subsequent wraps lying side by side on said pipeline supporting means thereby forming a first layer of pipe.

21. A method as claimed in claim 20, wherein additional layers of pipe are wound on top of said first layer, said layers being separated by battens.

22. A method as claimed in claim 21, wherein said layers comprise lengths of pipe of differing diameters.

23. A pipeline storage apparatus comprising:

a closed loop of rail track;

a plurality of rail bogies mounted on said track and distributed around said loop, each of said rail bogies being adapted to retain at least one turn of a length of pipeline;

a motor which drives said rail bogies around said loop in synchronism; and a roller box which guides said pipeline to and from said storage apparatus in a substantially horizontal pipe approach path approximately tangential to said loop.

24. The apparatus as claimed in claim 23, wherein said rail bogies are disposed substantially equidistantly around said loop.

25. The apparatus as claimed in claim 23, wherein adjacent bogies are rigidly coupled to one another.

26. The apparatus as claimed in claim 23, wherein said roller box is suspended from a gantry extending over said loop.

27. The apparatus as claimed in claim 23, wherein each rail bogie includes a strut disposed on one side thereof.

28. A method of storing a length of pipeline, said method comprising the acts of:

mounting said pipeline on rail bogies, said rail bogies being mounted on a closed horizontal loop;

driving said bogies around said loop in synchronism with one another so that said pipeline extends around said loop, supported by said bogies; and guiding said pipeline onto or off of said rail bogies along a substantially horizontal pipe approach path that is approximately tangential to said loop.

* * * * *